United States Patent [19]

Peacock

[11] Patent Number: 4,757,876
[45] Date of Patent: Jul. 19, 1988

[54] FOLDABLE TAIL GATE STEP ASSEMBLY

[76] Inventor: William D. Peacock, 10968 Baroque La., San Diego, Calif. 92124

[21] Appl. No.: 17,714

[22] Filed: Feb. 24, 1987

[51] Int. Cl.⁴ .............................................. B60R 3/02
[52] U.S. Cl. ...................................... 182/95; 182/97; 182/127; 280/166; 296/62
[58] Field of Search ................................ 182/1, 90–97, 182/163, 164, 156, 152, 27, 127, 228, 22–26, 499, 153, 86, 88, 89, 98; 248/188.5; 280/166; 296/62

[56] References Cited

U.S. PATENT DOCUMENTS

| | | | |
|---|---|---|---|
| 720,891 | 2/1903 | Chamberlain et al. | 182/156 |
| 1,363,396 | 12/1920 | Cross | 280/166 |
| 3,042,141 | 7/1962 | Hartman | 182/95 |
| 3,176,334 | 4/1965 | Lovdahl | 182/97 X |
| 3,313,511 | 4/1967 | Koerner et al. | 248/499 |
| 3,927,903 | 12/1975 | Jones | 280/166 |
| 3,980,157 | 9/1976 | Wrigley | 182/95 X |
| 4,021,071 | 5/1977 | Norman | 182/97 X |
| 4,401,184 | 8/1983 | Sherry | 182/163 X |
| 4,494,465 | 1/1985 | Fick | 248/188.5 X |

*Primary Examiner*—Alvin C. Chin-Shue
*Attorney, Agent, or Firm*—Charmasson & Holz

[57] ABSTRACT

A collapsible step ladder assembly in combination with a panel of a vehicle such as a tail gate or bed of a pickup truck, having a foldable frame, at least one foldable step or platform, a pair of extension legs, and a pair of articulating joints for connecting said frame to the panel. Each foldable step comprises a platform connected to the respective arms, and a pair of leveling braces that are positioned and dimensioned to hold the platform in a substantially horizontal position when the step ladder is fully deployed between an upper and lower service. Said braces also allow the folding of the platform to a position substantially co-planar with the respective arms.

8 Claims, 1 Drawing Sheet

U.S. Patent  Jul. 19, 1988  4,757,876
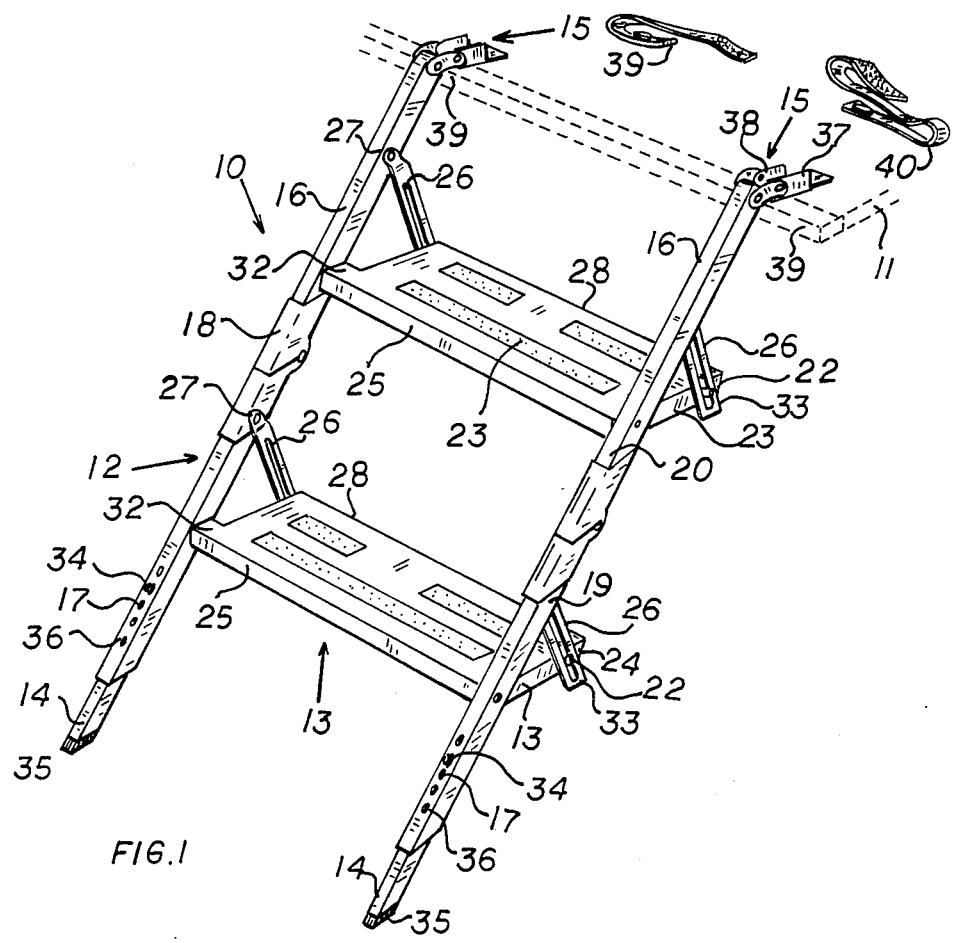
FIG.1
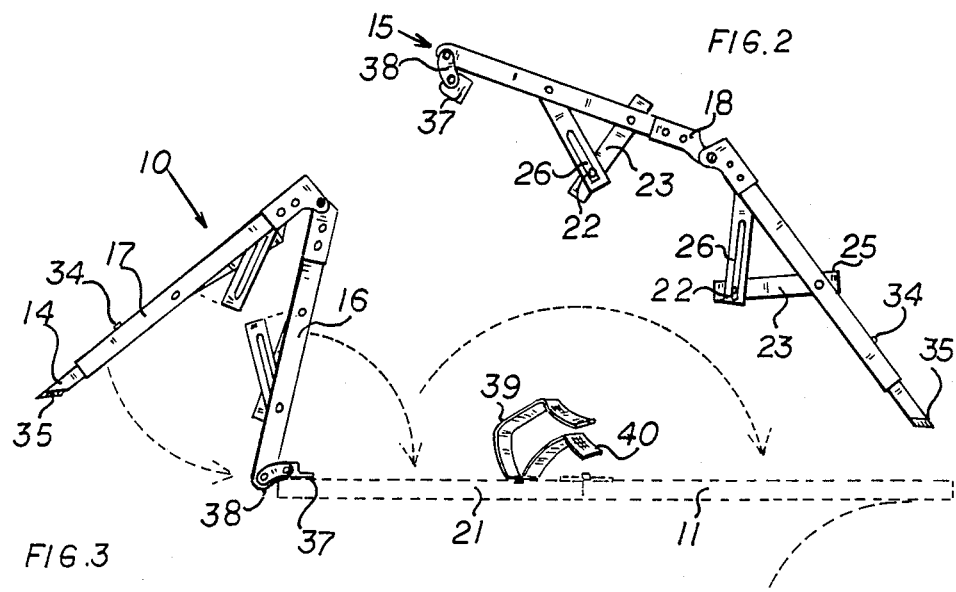
FIG.2
FIG.3

FOLDABLE TAIL GATE STEP ASSEMBLY

FIELD OF THE INVENTION

The present invention relates to a step assembly and more specifically to a collapsible step ladder assembly adapted for use with the bed or tail gate of a pickup truck.

DESCRIPTION OF THE PRIOR ART

Trucks are designed for use as utility vehicles, wherein workers have to gain access to the platform or bed of the vehicle. With the continuously increasing state and federal health and safety standards, many of the presently existing step assemblies are, or would be in the near future considered as a safety hazard rather than a useful arrangement.

The tail gate step disclosed in the Barksdale U.S. Pat. No. 4,191,388 is such an example. The Barksdale patent describes a single step which falls against the tail gate of a truck.

Such an arrangement lacks stability, and that constitutes a free swinging step which may cause the user to lose his balance, especially when he is not maintaining his full attention to his steps, such as when handling heavy articles aboard the truck bed.

Furthermore, the weights of the user and any additional load are supported by two flanges and bolts. Such weights would normally average to 100 kilograms (220 pounds), which over an extended period of use, could cause the support mechanism to break down.

Since the step described in that patent is basically a simple narrow rod, rather than a wide step, the user's foot tends to rotate forward, and the user would then need an additional support to preserve his equilibrium.

Yet another disadvantage of the Barksdale tail gate step is that it can only be used at a 90 degree angle, perpendicularly to the truck bed and the ground. Such angle is both dangerous and uncomfortable.

The constant length of the step supports presents another inconvenience for the user. The length of the step supports would at most be equal to the width of the tail gate, normally 50 centimeters (19.70 inches). The average height of truck tail gates is about 76 centimeters (29.92 inches), thus bringing the step to a height of about 26 centimeters (10.22 inches) from the ground, a very uncomfortable and inconvenient height.

Another relevant reference is Cormier U.S. Pat. No. 4,079,815 which describes a telescopically extendable step assembly.

The range of use of this disclosed step assembly is limited since the upright frame members should be attached to a vertical surface, rather than to a horizontally extended tail gate.

In addition, the full length of the telescoping arms is fixed, thereby setting the angle of use between the upright member and the extended arm to a constant nonadjustable value.

Furthermore, the steps or rungs are preferably securely fastened to their respective pairs of telescoping sections as by welding. Thus necessitating the narrowing of the step to limit their protrusion and to allow for a more compact packaging.

There is thus a long felt need for a compact and storageable tail gate step assembly, that addresses and provides an inexpensive and simple solution to the above problems in the field.

SUMMARY OF THE INVENTION

The above-stated need is provided by the present invention, whose principal and secondary objects are:
 to provide a compact, collapsible and storageable step ladder assembly for a vehicle bed or tail gate;
 to provide a safe and stable step ladder assembly;
 to provide an extensible assembly accommodable to truck beds or tail gates of variable heights;
 to provide a step ladder assembly that enables the distribution of the bulk of the load thereon between the truck bed or tail gate and the ground;
 to provide a step ladder assembly with wider steps for stability; and
 to provide a step ladder assembly with adjustable angle of use for a more comfortable performance.

These and other objects are achieved by a collapsible step ladder assembly in combination with a panel of a vehicle such as the tail gate or bed of a truck. Said step ladder assembly having a foldable frame, at least one foldable step, a pair of extension legs and a pair of articulating joints for connecting said frame to the panel.

DESCRIPTION OF THE DRAWINGS

FIG. 1 is a perspective view of the present invention attached to the tail gate of a vehicle shown in dotted lines;

FIG. 2 is a side view of the invention in a partially folded position; and

FIG. 3 is a side view of the invention in a semi-folded position about to be stored on the inside of the tail gate of a truck shown in dotted lines.

DESCRIPTION OF THE PREFERRED EMBODIMENT OF THE INVENTION

Referring now to FIGS. 1 and 2, the preferred embodiment of the collapsible step ladder assembly 10 is shown attached to to edge of the load carrying bed or tail gate 11 of a truck. The step ladder 10 includes a foldable frame 12; a foldable step assembly 13; a pair of extension legs 14; and a pair of articulating joints 15.

The foldable frame 12 comprises a pair of parallel and spaced-apart upper arms 16; a pair of parallel and spaced-apart lower arms 17; and means for articulating attaching the upper ends 19 of said lower arms 17 to the lower ends 20 of the upper arms 16. Such attaching means includes a pair of hinges 18.

The foldable step assembly 13 spans between the respective pairs of upper arms 16 or lower arms 17. The step assembly 13 includes a horizontal oblong platform, step or rung 23 which is pivotally connected to the respective pairs of upper or lower arms 16 or 17, about an axis which runs along the frontal edge 25 of the platform 23.

The step assembly 13 also comprises a pair of leveling braces 26, each brace 26 has an upper extremity 27 pivotally connected to a respective upper or lower arm 16 or 17 above and distally from the axis.

The leveling braces 26 serve a dual function: to guide the pivoting movement of the platform 23 and to provide support and reinforcement thereto.

Each leveling brace 26 comprises a longitudinal slot 24 along its length. The ends 22 of reinforcement rod or bar (not shown), slidingly pass through the opposite slots 24. The reinforcement bar supports the dorsal edge 28 of the platform 23 over its entire length.

Thus, when a load is placed on the platform 23, the weight is distributed between the platform 23, the reinforcement bar and the leveling braces 26.

Each platform 23 has two end stops 32 along its frontal edge 25. These end stops 32, the leveling braces 26 and the slots 24 are so dimensioned as to let the lower extemity 33 of the leveling brace engage the underside of the end stops 32, and lock the platform 23 into a compact folded position suitable for storage.

Such design will limit the rotation angle of the platform 23 and insure that the platform 23 is co-planar with the respective arms 16 and 17, when in a folded position.

The braces 26 are also designed and dimensioned to hold the platform 23 in a substantially horizontal position when the step ladder 10 is fully deployed between the upper surface 11 and the lower surface or ground.

When unfolded, the platforms 23 are more safely and comfortably used in a horizontal position, parallel to the lower surface or ground 31. The extension legs 14 served a dual purpose of adjusting the angle of use of the platforms 23; and adapting the step ladder assembly 10 to tailgates or upper surfaces 11 of various heights.

Even though FIGS. 1 and 2 illustrates the use of two platforms 23 and two pairs of arms 16 and 17, the design of the step ladder assembly 10 may require a lesser or greater number of arms 16 or 17 and platforms 23, depending on the mode of use of the step ladder assembly 10 and the height of the tail gate 11 or the surface to which the step ladder assembly 10 will be attached.

Each extension leg 14 is shaped and dimensioned to telescopically and slidably move within the lower arm 17. The extension leg 14 comprises one spring-loaded nipple 34 at its upper part, while its lower part is covered by a rubber plug 35.

The lower arm 17, on the other hand, has several holes 36 along its length, wherein the nipple 34 is inserted to vary the protruding length of the extension legs 14.

The rubber plug 35 acts as a shock absorber and renders the climbing more comfortable. It prevents the legs from sliding. It prevents dirt from getting inside the extension legs and the arms 16 and 17. Furthermore, it safeguards the users from the cutting or rough edges of the extension legs 14.

Another important feature of the assembly 10 is the articulating joints 15. As illustrated in FIGS. 1 and 2, each articulating joint 15 comprises a bracket 37 bolted to the bed 11, and hinges around two parallel yokes 38. In turn, these two yokes 38 pivot around the upper end of the upper arm 16.

For a more efficient adaptation of the assembly 10 to the panel 11, the yokes 38 are shaped and designed to closely embrace the edge 39 of the bed 11. Such design is necessary to relieve part of the load or pressure from the articulating joints 15 and to transmit it to the panel 11.

The net result of the assembly 10 design would be to minimize the load on the articulating joints 15 and to distribute the bulk of the load between the bed 11 and the ground upon which the assembly 10 rests. Thus increasing the safety factor and longitivity of the assembly 10.

As shown in FIG. 3, the assembly 10 can be rotated from an extended position for use to retracted, compacted position for storage against the inside of a tail gate hinged to the end of the bed 11. The assembly 10 is held in a folded position by means of two Velcro brand straps 39-40.

While the preferred embodiment of the invention has been described and modifications thereto have been suggested, other applications could be devised and other changes could be made without departing from the spirit of the invention and the scope of the appended claims.

What is claimed is:

1. In combination with the tail gate horizontally hinged to the back edge of a utility vehicle bed, wherein said tail gate can be moved from a vertical closed position to a horizontal open position where it lies in the plane of said bed and forms a rearward extension thereof, a collapsible step ladder deployable between said tail gate and a lower surface which comprises:
   a foldable frame including:
      a pair of parallel and spaced-apart upper arms;
      a pair of parallel and spaced-apart lower arms; and
      means for articulately attaching the upper ends of said lower arms to the lower ends of said upper arms; and
   at least one foldable step spanning one of said pair of arms including:
      a horizontal oblong platform pivotally connected to one of said pairs of arms about an axis running near the frontal edge of the platform;
      a pair of leveling braces, each brace having its upper ends pivotally connected to one arm of said pair above and distally from said axis;
      means for slidingly connecting the dorsal edge of the platform over the length of the brace;
      said brace being positioned and dimensioned to hold the platform in a substantially horizontal position when the step ladder is fully deployed between said tail gate and lower surfaces, and to allow folding of the platform about said axis to a position substantially co-planar with said pair of arms; and
   means for articulating connecting the upper ends of said pair of upper arms to said tail gate, said means for connecting comprising:
      a pair of brackets tightly secured near the rear edge of the upper surface of said tail gate when said tail gate is in said open position;
      two pairs of parallel yokes, each pair being pivotally secured at one end to opposite sides of one of said brackets, each of said yokes being dimensioned so that the other end of each yoke projects beyond said rear edge of the tail gate, and said projecting other ends of each pair of yokes being pivotally attached to one of the upper ends of said upper arms.

2. The step ladder of claim 1, wherein each of said braces has a longitudinal slot along its length, and wherein said means for slidingly connecting the dorsal edge of the platform comprises a bar which transversely passes through the pair of opposite slots and supports the underside of said platform.

3. The step ladder of claim 2, wherein each of said braces is dimensioned and positioned to nest between one of said arms and the side of said platform.

4. The step ladder of claim 2, which further comprises a pair of extension legs, each extension leg being telescopically and slidably located within said lower arm.

5. The step ladder of claim 4, wherein each lower arm comprises a plurality of holes along its length, and wherein the extension leg comprises a spring-loaded nipple which fits and protrudes through said holes.

6. The step ladder of claim 5 which further comprises one pair of rubber plugs being firmly secured to the lower part of the extension legs.

7. The step ladder of claim 6 which further comprises means for strapping the step ladder when it is folded and stored.

8. The assembly of claim 6, wherein said platform comprises two end stops along its frontal edge; and wherein the braces are shaped and designed and dimensioned to engage the underside of said stops, and to retain the platform in a locked position, when said platform is in a folded position.

* * * * *